(12) United States Patent
Ohrndorf et al.

(10) Patent No.: US 6,416,227 B1
(45) Date of Patent: Jul. 9, 2002

(54) METHOD AND DEVICE FOR DISPOSING OF LUBRICANTS FROM A PLAIN BEARING

(75) Inventors: Henning Ohrndorf, Niederfischbach; Hermann Thiel, Siegen, both of (DE)

(73) Assignee: SMS Schloemann-Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 09/674,131
(22) PCT Filed: Apr. 27, 1999
(86) PCT No.: PCT/EP99/02830
§ 371 (c)(1),
(2), (4) Date: Feb. 20, 2001
(87) PCT Pub. No.: WO99/57449
PCT Pub. Date: Nov. 11, 1999

(30) Foreign Application Priority Data

May 2, 1998 (DE) .......................................... 198 19 686

(51) Int. Cl.[7] ................................................. F16C 1/24
(52) U.S. Cl. ......................... 384/414; 384/322; 384/403
(58) Field of Search ................................. 384/414, 403, 384/322, 398, 400

(56) References Cited

U.S. PATENT DOCUMENTS 4,632,650 A   12/1986   Frieden et al.

FOREIGN PATENT DOCUMENTS

| DE | 1301642 | 8/1969 |
|----|---------|--------|
| DE | 4427830 | 11/1995 |
| WO | 9216786 | 10/1992 |

Primary Examiner—Lenard A. Footland
(74) Attorney, Agent, or Firm—Friedrich Kueffner

(57) ABSTRACT

The invention relates to a method for disposing of a lubricant, preferably oil, of which a controlled supply is provided to a friction bearing, especially a roll neck bearing of a chock. Said lubricant flows into the bearing box and is disposed of below through a lubricant sump. According to said method, the lubricant which has collected in the sump is disposed of upwards with the aid of a vacuum. To this end, the bearing case (1) is configured with a discharge bore (10) which extends downwards into the lubricant sump (9), and is connected to the atmosphere via at least one ventilation bore (17) situated at the top end of the bearing, and an outlet line (15, 16). The discharge bore (10) has a pressure regulating valve (13) in a line (12) which is connected to a vacuum source (VQ). Said pressure regulating valve (13) has an interactive connection to a device for measuring the throughflow of air (14), said measuring device being located in the outlet line (15) of the ventilation bore (17).

4 Claims, 1 Drawing Sheet

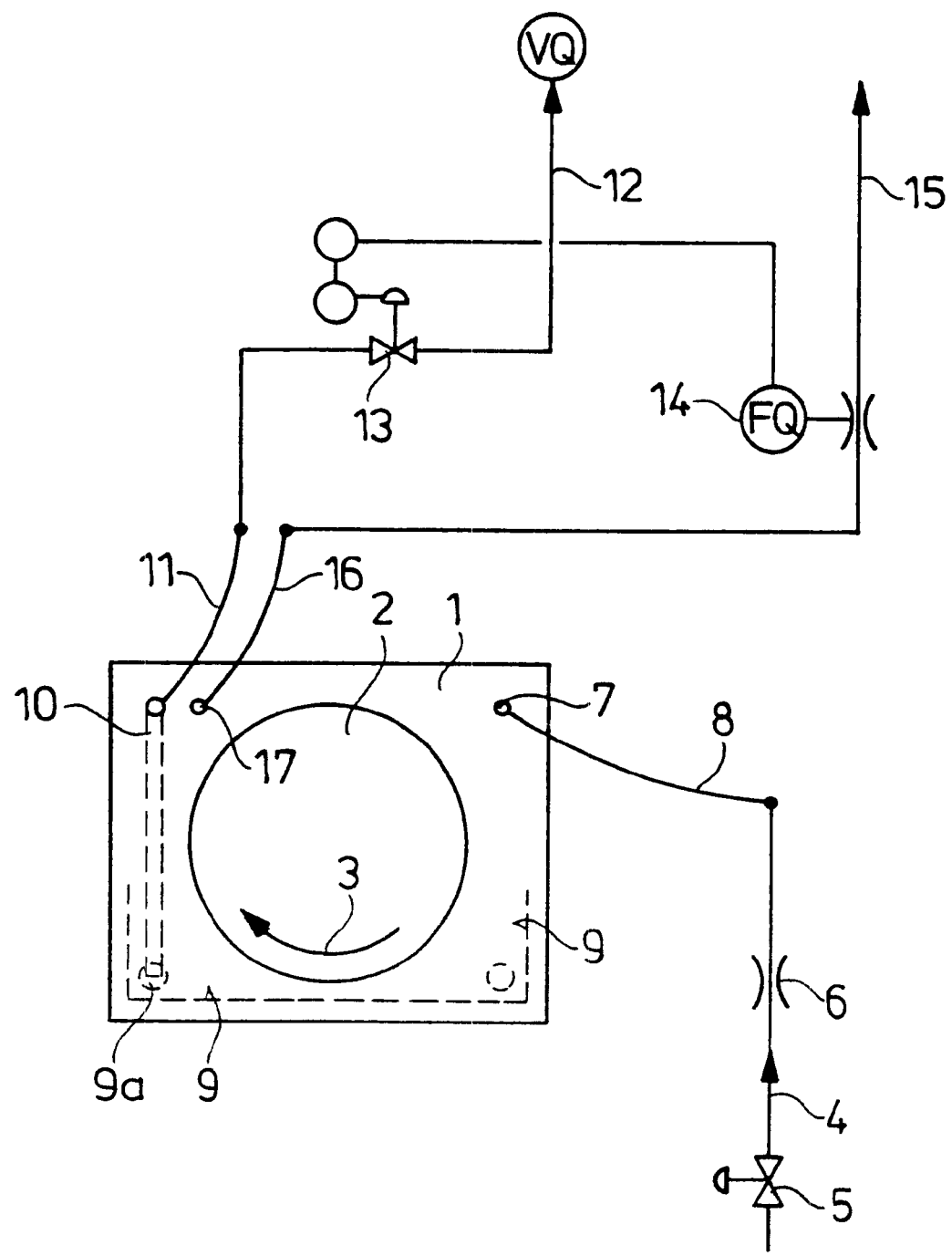

METHOD AND DEVICE FOR DISPOSING OF LUBRICANTS FROM A PLAIN BEARING

The invention relates to a method and a device for disposing of a lubricant, preferably oil, that is supplied in a controlled fashion to a plain bearing, especially a roll neck bearing of a chock, flows into the bearing case and is disposed of below from a lubricant sump.

In the rolling mill technology such bearing arrangements are known as so-called flood lubricated bearings; in their use primarily as roll neck bearings, they are utilized for transmitting adjusting forces in ingot, slab, and plate rolling stands as well as in hot and cold rolling mills in the steel and non-ferrous metal industry. With a substantially identical configuration they are suitable for all rolling force and rolling speed ranges occurring in rolling mills, for wet or dry operation as well as for single pass or reversing operation. A large load receiving capacity makes possible an adaptation to rotational speeds and loads occurring in rolling mills. In interaction with the chock receiving a roll neck, the plain bearing or flood lubricated bearing provides a lubricant distribution and flooding system that ensures a great cooling oil throughput with safe hydrodynamic lubricant film formation. For the purpose of supplying oil or lubricant, the chocks are connected by inlet and return or outlet lines to at least one oil collecting reservoir comprising an operating pump.

The lubricant or lubricating oil is supplied in a pressure-controlled fashion to the chocks by means of a pressure control comprising a pressure regulating valve and a fixed throttle, wherein the supply opening is arranged centrally above the roll neck and is connected by means of a hose line to the inlet line. After the lubricating process, the lubricant or lubricating oil which collects in a lubricant/oil sump—in general, two such sumps are provided which are connected by a transverse bore, in particular, one at the roll neck and the other positioned behind it in the direction toward the roll barrel—flows out gravitationally from the chock via two relatively large discharge openings with correlated hose connections extending to the return flow lines, i.e., back into the oil collecting reservoir. These known plain bearings used largely in practical operation as flood lubricated bearings with hydrodynamic lubricant film formation, which in the assembled state form together with the chock a closed oil-tight and dirt-tight unit which is mounted on the roll neck or removed from it, require large lubricant sumps which impede the mounting space for other components in the stand window of a roll stand. This is true also because of the large hose lines extending from the oil sumps for returning the lubricant into the oil collecting reservoir.

The invention has the object to provide a method and a device of the aforementioned kind without the aforementioned disadvantages, especially to enable an improved disposal or return of the lubricant from the respective sump of the chock or the bearing case.

This object is solved with a method according to the invention in that the lubricant collected in the sump is disposed of in the upward direction by vacuum support. The inventive vacuum-supported, preferably with controlled vacuum, return, which is entirely contrary to the decade-old practice of gravitational return flow, from the vented sump, where atmospheric pressure is present, provides as a result of the constantly produced vacuum, for example, by means of a screw pump, not only a faster disposal and lubricant sumps that require a correspondingly reduced space, but also eliminates the oil outflow hoses extending in the downward direction from the lubricant sumps. It is therefore possible in a simple way to gain mounting space for other components and/or, for example, a contour adaptation of the chock. When exchanging a roll, the chocks can be moreover completely emptied by a controlled vacuum pulse so that leakage during transport can be avoided and, also, the overall maintenance is simplified.

A preferred suggestion according to the invention provides that the bearing case with the sump is vented and the inflowing amount of air is measured. In doing so, on the one hand, it can be taken into consideration that a possibly occurring vacuum in the chock resulting from a sickle-shaped run of the bearing—and thus a static pressures above and below of different magnitude—does not have a negative effect on the vacuum-supported disposal because with the venting action an escape is possible. On the other hand, via the measurement of the inflowing amount of air a defined vacuum control parameter can be achieved and adjusted, for example, an air intake of 1 l/min. into the chock.

A device for a vacuum-supported disposal of the lubricant provides that the bearing case is formed with a discharge bore extending from above down into the lubricant sump—respectively, into the transverse bore connecting the two sumps that are present—as well as being connected via a venting bore arranged at the upper side of the bearing and via an outlet line with the atmosphere, wherein the discharge bore comprises a pressure regulating valve provided within a line connected to a vacuum source and being in interactive connection with an air flow meter arranged in the outlet line of the venting bore. Instead of two gravitational outflow lines, only one outflow line is required for the lubricant disposal which, because of the greater removal amount for the same amount of time as a result of the supplied vacuum, can be of a smaller size than previously possible. Hose lines are arranged only above the center of the bearing case, i.e., on the one hand, for the discharge bore and, on the other hand, for the venting bore as well as the unchanged lubricant supply from above; all other components or parts of the lubricating device are positioned in an area which is remote from the bearing arrangement, respectively, the chock and present no disturbance. The supplied vacuum ensures that the lubricant can be removed and returned from the sump quasi in a "snorkeling" action via the discharge bore (snorkel bore) which is optionally formed by an inserted or cast pipe.

Further details and advantages of the invention result from the claims and the subsequent description in which an embodiment of the invention for a horizontal chock with support roll neck bearing, schematically illustrated in the only drawing FIGURE, is described in more detail.

Of a roll arrangement in a roll stand, not illustrated in more detail, the FIGURE shows as a detail a chock 1 with a roll neck 2 of a rolling mill roll, rotating in the direction of arrow 3, supported therein. The bearing of the roll neck 1 has correlated therewith a lubricant distribution and flooding system, not shown in further detail, which comprises a lubricant supply line 4 that extends from an oil collecting reservoir and comprises an integrated pressure regulating valve 5 and a fixed throttle 6 which provides a controlled lubricant supply via an inlet opening 7 arranged on top or laterally in the chock 1 which is connected by a hose line 8 with an inlet line 4. After the lubrication process, the lubricant is collected in a lubricating sump 9, provided in the chock 1 and indicated in dashed lines, which has connected thereto a further such sump behind it in the plane of the drawing, i.e., at the roll barrel side; the two sumps are connected with one another by a transverse bore 9a illustrated schematically as a dashed circle.

For returning the lubricant from the lubricant sump 9 into the oil collecting reservoir, the chock or the bearing case 1 is provided with a discharge bore 10 extending from the top into the transverse bore 9a of the lubricant sump 9 from where a discharge hose line 11 extends to a vacuum line 12 which is connected to a vacuum source VQ, not illustrated. The vacuum line 12 has as an integrated component a pressure regulating valve 13 which is in interactive connection with a flow meter 14 or FQ. The latter is arranged in an outlet line 15 which is connected via a venting hose line 16 with a venting bore 17 arranged in the zenith of the chock 1 parallel to the discharge bore 10; it opens via the line 16 or 15 into the atmosphere.

During the vacuum-supported discharge of the lubricant sump 9 in the upward direction out of the chock 1, the flow meter 14 in the outlet line 15 of the venting bore 17, in cooperation with the pressure regulating valve 13 of the vacuum line 12, provides a defined adjustment of the vacuum control parameter, i.e., of the venting of the bearing case 1 together with the sumps 9 for disposal of the lubricant via the discharge bore 10, based on the determined measured values.

What is claimed is:

1. A method for disposing a lubricating oil, supplied in a controlled fashion to a plain roll neck bearing of a chock, which flows into the bearing case and is disposed of below from the lubricant sump, characterized in that the lubricant collected in the sump is disposed of in the upward direction by vacuum support.

2. The method according to claim 1, characterized in that the vacuum is controlled.

3. The method according to claim 1 or 2, characterized in that the bearing case is vented and the inflowing amount of air is measured.

4. A device for disposing of a lubricanting oil, supplied in a controlled fashion to a plain roll neck bearing of a chock, which flows into the bearing case and is disposed of below from the lubricant sump, for performing the method according to claim 1, characterized in that the bearing case (1) is provided with a discharge bore (10) extending from the top down into the lubricant sump as well as being connected via at least one venting bore (17) arranged at the top of the bearing via an outlet line (15, 16) with the atmosphere, wherein the discharge bore (10) comprises a pressure regulating valve (13) in a line (12) connected to a vacuum source (VQ) which is in interactive connection with an air flow meter (14) arranged in the outlet line (15) of the venting bore (17).

* * * * *